Patented Dec. 10, 1929

1,739,091

UNITED STATES PATENT OFFICE

CHARLES F. RITCHIE AND WILLIAM A. GALE, OF TRONA, CALIFORNIA, ASSIGNORS, BY MESNE ASSIGNMENTS, TO AMERICAN POTASH & CHEMICAL CORPORATION, OF NEW YORK, N. Y., A CORPORATION OF DELAWARE

PROCESS FOR REFINING CRUDE BORAX

No Drawing. Application filed October 8, 1926. Serial No. 140,415.

This invention relates especially to refining crude borax such as that obtained from the evaporation and manipulation of certain natural alkaline brines such as the brine of Searles Lake, California.

A typical brine of Searles Lake has essentially the following composition:

| | Per cent |
|---|---|
| $Na_2SO_4$ | 6.8 |
| $NaCl$ | 16.5 |
| $KCl$ | 4.8 |
| $Na_2CO_3$ | 4.8 |
| $Na_2B_4O_7$ | 1.51 |
| $Na_3PO_4$ | 0.155 |
| $Na_3AsO_4$ | 0.040 |

In the above analysis we have expressed the total boric oxide ($B_2O_3$) content of this brine in the terms of sodium tetraborate. However in such brine there is always present a certain amount of sodium metaborate ($Na_2B_2O_4$).

We have found that this sodium metaborate which is of itself quite soluble, reacts with the trisodium phosphate and the trisodium arsenate to form double salts, such as,

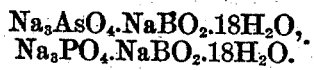
$Na_3AsO_4.NaBO_2.18H_2O$,
$Na_3PO_4.NaBO_2.18H_2O$.

We have discovered that these double salts are only sparingly soluble. We have also discovered that borax produced from the brine of Searles Lake may be seriously contaminated with phosphates and arsenates and the methods heretofore available for the removal of these phosphates and arsenates have been accompanied by certain disadvantages that are avoided by our new process.

Our improved process is based upon our discovery that the phosphate and arsenate double salts, described above, may be dissolved in the natural or untreated brine at the temperature at which the brine is found; that is, about 22° C. We have also found that the brine of Searles Lake will not dissolve borax at the temperature at which it occurs, that is to say, the natural brine is saturated with borax at 22° C.

By combining these phenomena of our discovery we are able to refine borax in a very efficient and satisfactory manner.

In operating a closed cycle in which the end liquors of the process are continuously returned for further evaporation, the phosphate and arsenate accumulate in the liquors and are subsequently precipitated in the crude borax in proportion to their respective concentrations in the natural brine.

We have found certain crude borax, obtained by the evaporation and manipulation of Searles Lake brine to have approximately the following composition:

| | Per cent |
|---|---|
| $Na_2B_4O_7.10H_2O$ | 82 |
| $Na_3PO_4.NaBO_2.18H_2O$ | 15 |
| $Na_3AsO_4.NaBO_2.18H_2O$ | 3 |

In the following description of our invention we shall refer to a borax containing appreciable quantities of phosphate and arsenate impurities, such as the above, as crude borax.

It is in the refining of such a crude borax that our invention is of special value. One method which has been practiced in the refining of crude borax is that of dissolving the same in hot water and recovering the pure borax from the solution by a process of fractional crystallization. This process is costly and inefficient. In such a process it has been found necessary to supply energy both for heating the solution to dissolve the crude borax and subsequently for cooling the solution to the desired temperature to precipitate the refined borax. Furthermore such a process is also inefficient in that a certain quantity of the dissolving liquor must be discarded in order to dispose of the phosphate and arsenate impurities. In discarding this liquor a certain amount of borax in solution is also discarded, rendering the process inefficient and costly.

Processes for removing the phosphate and arsenate from the solution, such as precipitation with calcium salts, although highly satisfactory from an operating standpoint, have proven uneconomical, as compared with this process of our invention.

The process of our invention possesses none of the above mentioned disadvantages. By the process of our invention we are able to refine crude borax without loss of any of the original borax content. The process of our invention is furthermore economical by virtue of the fact that no energy is expended in heating and cooling.

Another advantage in favor of the process of our invention is the brine used to remove the impurities from the crude borax is readily available and the cost of materials is therefore practically negligible.

The following is a description of one method of carrying out the process of our invention. Five thousand pounds of crude borax having approximately the composition shown above are mixed with 2,500 gallons of natural brine at about 22° C. and the mixture agitated by means of air for two hours. The leached crude borax is then removed by means of a centrifugal machine and given a slight washing with cold water to displace the brine adhering to the crystals. The resulting refined borax, which is dried to remove adhering moisture, weighs 4,100 pounds and has the following composition:

|  | Per cent |
|---|---|
| $Na_3PO_4$ | 0.13 |
| $Na_3AsO_4$ | 0.04 |
| $Na_2B_4O_7.10H_2O$ | 99.56 |
| Moisture and undetermined | .27 |
| Total | 100.00 |

The 2,500 gallons of brine containing the phosphate and arsenate impurities of the crude borax may be discarded or subsequently treated to recover certain valuable constituents. Since the brine of Searles Lake may be had for the pumping, it is evident that the cost of material for the operation of our invention is extremely low.

Such a refined borax is satisfactory as a commercial product; having a purity above 99½ per cent. However, for certain special uses a more highly purified borax is desirable. The refined borax, produced by the process of our invention, may be recrystallized from water to produce a nearly perfect borax. Since the purity of the refined borax produced by the process of our invention is high, this second refining step may be carried out quite economically; for the same dissolving liquor may be used many times before the impurities have built up, to such a degree as to warrant its being discarded.

Although we have described our invention in the form in which we have found it most desirable and economical to employ it, we have found that certain advantages may be gained by departing slightly from the letter of the above description.

We have found that if the natural brine be heated from its original temperature, 22° C., to 32° C., that the solubility of the phosphate is so increased that 5,000 pounds of crude borax may be refined with only 1,500 gallons of natural brine instead of 2,500 gallons as was the case when natural brine of 22° C. was used. Searles Lake brine at 32° C. will dissolve a certain small amount of borax, thereby slightly affecting the advantage to be gained by the use of a lesser quantity of natural brine.

Although we have stated that the phosphates and arsenates occur in the crude borax as the double salts shown above, we do not wish it implied that our invention relates specifically to the removal of these salts alone. We have found phosphate and especially arsenate impurities existing in the crude borax in forms other than those described above, and have successfully refined such crude borax by the methods previously described.

We have found it advantageous to modify the procedure of our invention slightly in certain cases especially as regards the removal of the last mentioned arsenate impurities. We have found that a small quantity of an arsenical compound other than that previously described may be occluded within the borax crystal itself. In order to more completely remove such occlusions we have found it advantageous to heat the mixture of natural brine and borax to some temperature considerably above 22° C. By such a process the arsenate impurities are quite completely removed either by virtue of the complete solution of the borax crystals or the increased reactivity of the heated solvent, or both. The leached mass is then cooled to approximately 22° C. to recover the entire original content of borax substantially freed from all impurities. It is worthy of note that this modification of the process of our invention serves to remove certain other undesirable occlusions, such as organic matter.

We claim:

1. A process for refining crude borax consisting essentially in treating crude borax with natural brine substantially saturated with respect to borax, effecting the solution of the impurities of the borax in the brine, and separating the leached borax from the brine containing the dissolved impurities.

2. A process for refining crude borax consisting essentially in treating crude borax with natural brine substantially saturated with borax, agitating the solution to dissolve the impurities of the borax in the brine, and separating the leached borax from the brine containing the dissolved impurities.

3. A process of refining crude borax consisting essentially in treating crude borax with brine substantially saturated with borax at a temperature of 22° C., effecting the solution of the impurities of the borax in the brine, and separating the leached borax from the brine.

4. The process of refining crude borax consisting essentially in treating 5,000 pounds of crude borax with 2500 gallons of Searles Lake brine at a temperature of 22° C., effecting the solution of the impurities of the borax in the brine, and separating the leached borax from the brine.

5. The process of refining crude borax consisting essentially in treating crude borax with brine substantially saturated with borax, effecting the solution of the impurities of the borax in the brine and recrystallizing the borax so obtained.

6. A process of removing phosphate and arsenate impurities from crude borax which comprises digesting the crude borax crystals with Searles Lake brine.

7. The process of refining crude borax in which phosphate and arsenate compounds are present as impurities, which comprises digesting the crude borax in a body of Searles Lake brine at a raised temperature until the phosphate and arsenate have dissolved, and then filtering and drying the refined borax.

8. The process of refining crude borax which comprises treating crude borax with Searles Lake brine, filtering, and then recrystallizing from water.

In testimony whereof we affix our signatures.

CHARLES F. RITCHIE.
WILLIAM A. GALE.